Inventors
Francis C. Mason
John W. Shanahan
By Luther V. Moulton
Attorney

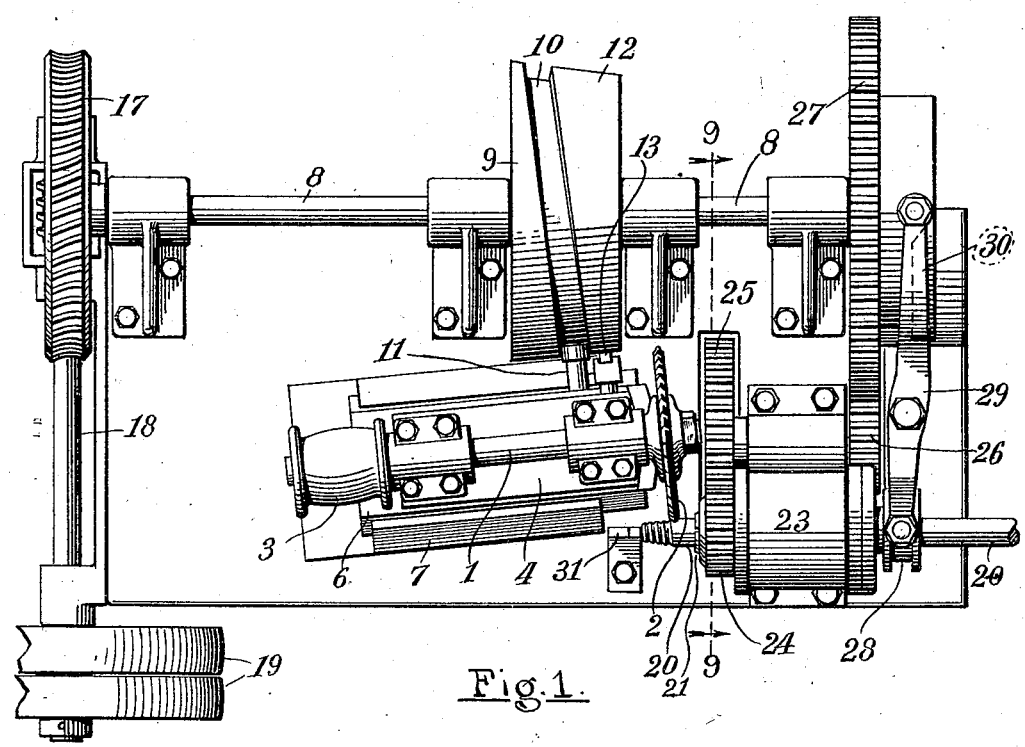
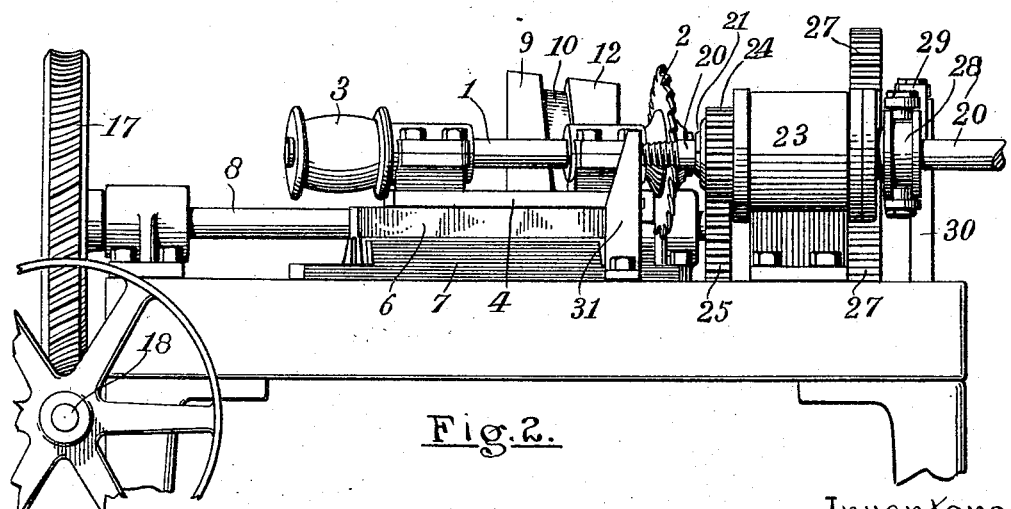

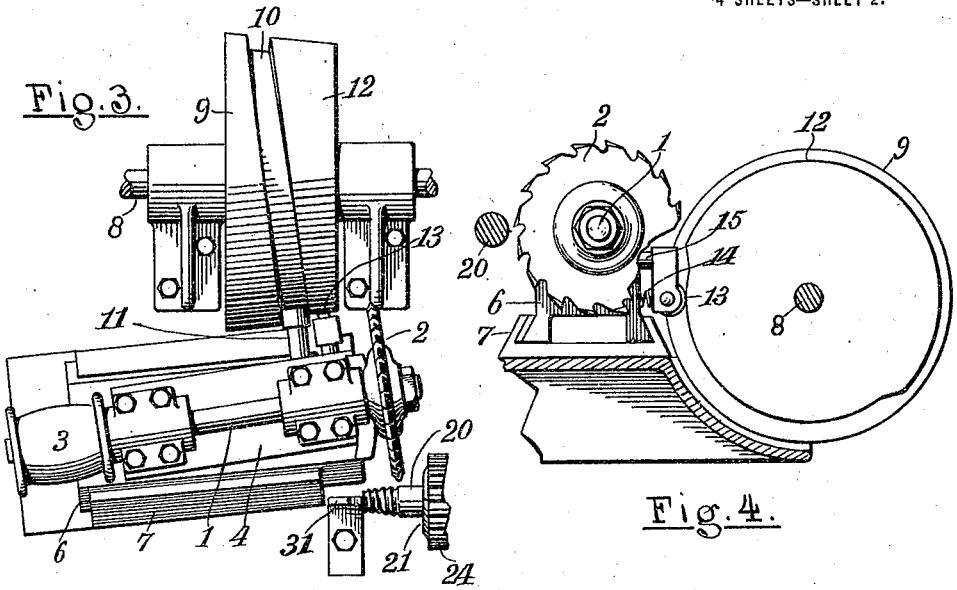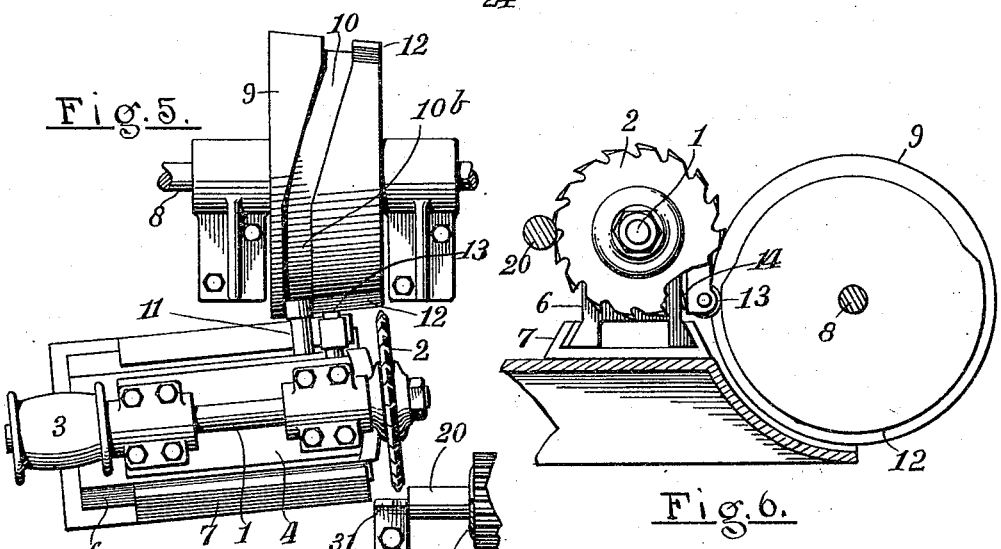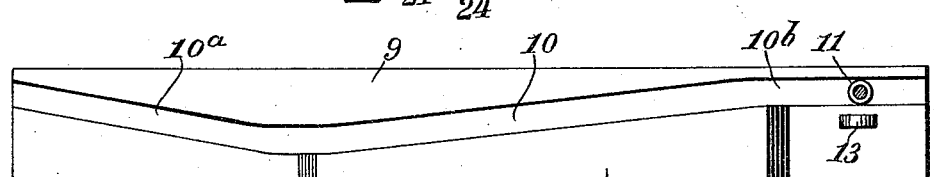

UNITED STATES PATENT OFFICE.

FRANCIS C. MASON AND JOHN W. SHANAHAN, OF GRAND RAPIDS, MICHIGAN, ASSIGNORS TO BISSELL CARPET SWEEPER COMPANY, OF GRAND RAPIDS, MICHIGAN, A CORPORATION OF MICHIGAN.

MACHINE FOR CUTTING TAPERED SCREW-THREADS.

1,188,469.  Specification of Letters Patent.  Patented June 27, 1916.

Application filed October 25, 1913. Serial No. 797,258.

*To all whom it may concern:*

Be it known that we, FRANCIS C. MASON and JOHN W. SHANAHAN, citizens of the United States of America, residing at Grand Rapids, in the county of Kent and State of Michigan, have invented certain new and useful Improvements in Machines for Cutting Tapered Screw-Threads; and we do hereby declare the following to be a full, clear, and exact description of the invention, such as will enable others skilled in the art to which it appertains to make and use the same.

Our invention relates to improvements in machines for cutting tapered screw threads, and more particularly for cutting such threads on the end of wooden carpet sweeper handles and the like, and its object is to provide a semi-automatic machine having various new and useful features hereinafter more fully described and particularly pointed out in the claims.

Our device consists essentially of an arbor carrying a suitable tool for cutting the thread, said arbor being mounted on a carriage reciprocating in line with the axis of the arbor, an automatic chuck for holding the work, means for revolving the chuck and work, the axis of the arbor and axis of the work being inclined to form the proper taper of the screw, improved means for automatically reciprocating the carriage, improved means for automatically opening and closing the chuck and improved means for moving the tool toward and away from the work, substantially as hereinafter more fully described, reference being had to the accompanying drawings, in which:—

Figure 8:
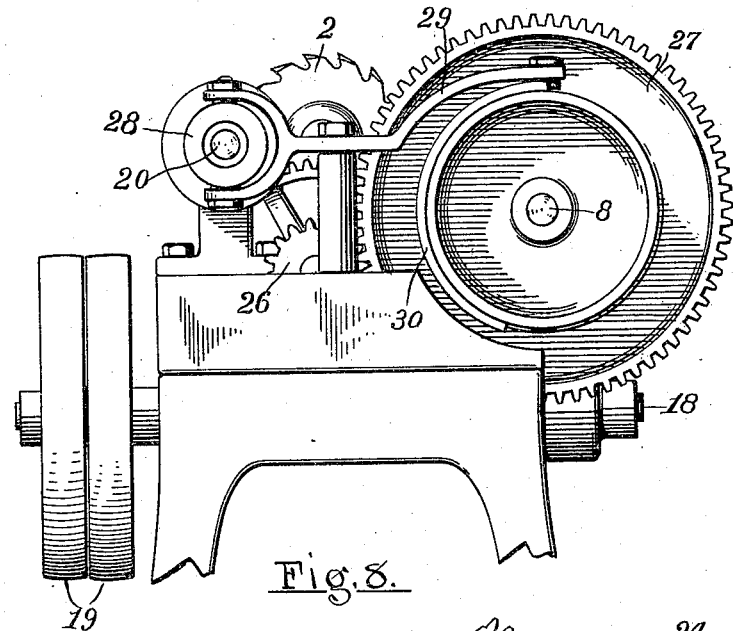
Figure 9:
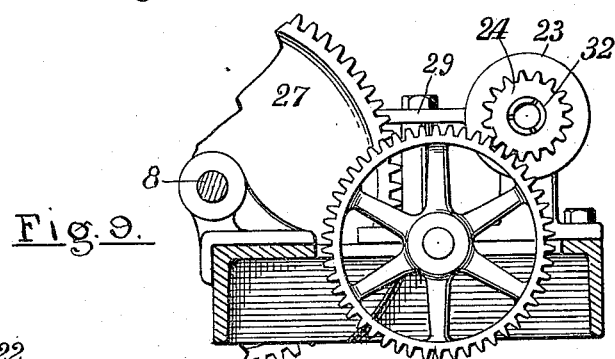
Figure 10:
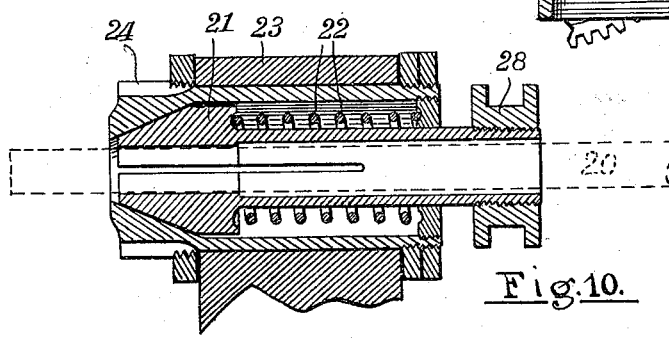
Figures 11, 12:
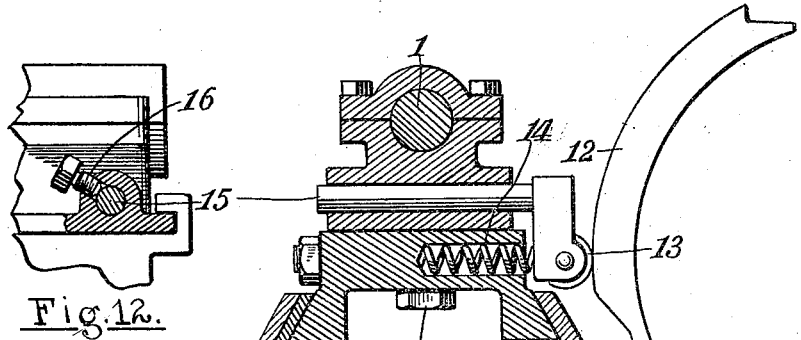
Figure 13:
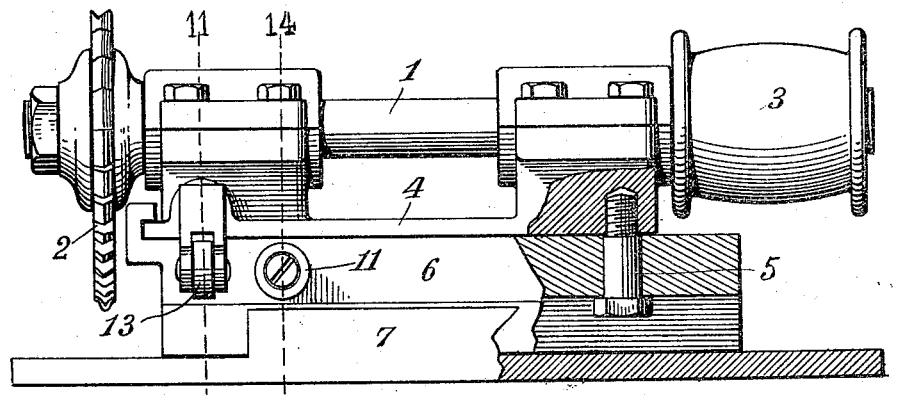
Figure 14:
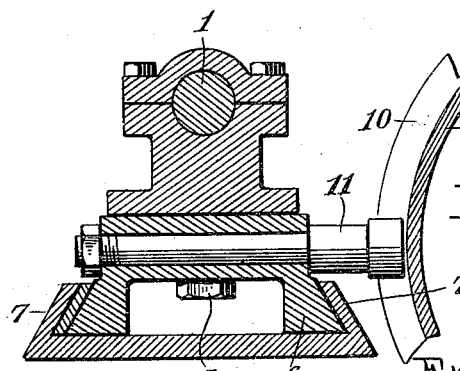

Figure 1 is a plan view of a machine embodying our invention; Fig. 2 a front elevation of the same; Fig. 3 a detail in plan view, showing the parts with the tool or cutter retracted; Fig. 4 an end elevation of a portion of the device shown in Fig. 3; Fig. 5 a plan view in detail, showing the tool advanced ready to begin operation; Fig. 6 an end elevation of a portion of the device, shown in Fig. 5; Fig. 7 a plane projection of the circumference of the cam wheel; Fig. 8 an end elevation of the machine; Fig. 9 a vertical section on the line 9—9 of Fig. 1; Fig. 10 an enlarged sectional detail of the automatic chuck for holding the work; Fig. 11 a vertical section on the line 11—11 of Fig. 13; Fig. 12 a sectional detail at right angles to Fig. 11; Fig. 13 an enlarged elevation of the carriage, with parts broken away; and Fig. 14 a transverse section of the same on the line 14—14 of Fig. 13.

Like numbers refer to like parts in all of the figures.

1 represents an arbor carrying a tool 2 at one end adapted to cut the desired thread, the arbor also being provided with a suitable pulley 3, driven by any convenient belt. This arbor is mounted on a bed plate 4 pivoted near the end next the pulley, as at 5, and mounted upon a carriage 6 slidable in ways 7 to traverse the tool longitudinally of the work and form the screw on the same as the work is slowly rotated. To traverse the carriage, and to move the tool into and out of engagement with the work, a shaft 8 is provided carrying a cam wheel 9 having a cam groove engaged by a stud 11 on the carriage to traverse the carriage longitudinally. This groove has a portion 10 which traverses the carriage in one direction during the cutting operation of the tool and a quick return portion $10^a$ which traverses the carriage back to starting position, and a non-traversing portion $10^b$ parallel with the plane of the wheel. The wheel 9 is also provided with a cam surface 12 to engage a roller 13 projecting from the plate 4 near the tool, whereby the plate is swung on its pivot and the tool moved into engagement with the work and a spring 14 yieldably swings the tool toward the cam wheel and away from the work when the cam does not engage the roller. The cam surface 12 operates and extends opposite the working portion 10 of the cam groove, and thus while the tool is cutting the screw it is advanced to operating position, and while the carriage is making the return stroke and is at rest the tool is retracted away from the work. The working position of the tool is shown in Figs. 5 and 6 and the retracted position of the same is shown in Figs. 3 and 4. The roller 13 is journaled in a yoke on the end of a pin 15 longitudinally adjustable in the plate to determine the diameter of the screw, and is held adjusted by a suitable set screw 16. The shaft 8 is slowly rotated by worm gearing 17 driven by a counter shaft 18 having tight and loose pulleys 19 for any convenient operating belt.

To hold the work, (such as a carpet sweeper handle 20) we provide a chuck 21 journaled in a suitable bearing 23 and normally closed by a yieldable spring 22; said chuck is also provided with a pinion 24 engaged by a gear 25 driven by a pinion 26 connected thereto, which latter pinion is in turn rotated by a gear 27 on the shaft 8. This train of gearing may be changeable, whereby the pitch of the screw can be varied. To automatically open the chuck against the action of the spring when the screw has been formed, we provide the chuck with a grooved collar 28 engaged by one end of a lever 29 pivoted intermediate its ends and operated by a cam 30 mounted on the shaft 8. This cam swings the arm 29 on its pivot to open the chuck and release the work, and is adjusted to so operate during the time the carriage is making the return stroke and is at rest, and the tool is in retracted position. To adjust the work longitudinally in the chuck a fixed stop 31 is provided against which the work is placed when inserting the same in the machine.

To form a conical screw, the ways 7 are inclined to the axis of the shaft 8 and the cam wheel 9 is made conical so that its surface next the carriage is parallel with the movement of the carriage and the axis of the chuck is arranged parallel with the axis of the shaft 8. If preferred, the carriage may be made to move parallel with the shaft 8, the cam wheel made cylindrical and the axis of the chuck inclined to the axis of the shaft 8 to taper the screw.

From the foregoing description the operation of our machine will be readily understood.

During the time that the carriage is making a return stroke and is at rest, that is to say, while the stud 11 is traversing the portions $10^a$ and $10^b$ of the groove in the wheel 9, the chuck will be opened by the cam 30 and lever 29. The finished work is then removed by the operator and another handle placed in the chuck with its end against the stop 31. Just before the carriage starts upon the working stroke the tool is advanced toward the work by the cam 12 and the clutch is allowed to close by the cam 30 passing beyond and releasing the lever 29. At the end of the working stroke the tool is retracted from the work; the return stroke and rest of the carriage again occurs and the operation repeated, the operator removing the finished handles and placing others in the machine in succession at each cycle of operation of the machine. The machine thus performs a cycle of operations to each revolution of the shaft 8.

What we claim is:—

1. A screw cutting machine comprising a main shaft, a cam wheel on the shaft provided with a cam groove and a cam peripheral portion adjacent the groove, a reciprocal carriage, a tool adapted to form a screw thread, a plate on which the tool is mounted, the plate being pivotally mounted on said carriage, a stud on the carriage to engage in said cam groove, the latter being formed to traverse the carriage in one direction to effect the cutting operation and to traverse the carriage in the opposite direction back to starting position and also having a non-traversing portion parallel to the plane of the cam wheel to temporarily arrest operation of the tool, and a roller on the carriage engaging the aforesaid cam peripheral portion of the cam wheel to shift said plate on its pivot and thereby move the tool into engagement with the work.

2. A screw cutting machine comprising a main shaft, a cam wheel on the shaft provided with a cam groove and a cam peripheral portion adjacent the groove, a reciprocal carriage, a tool adapted to form a screw thread, a plate on which the tool is mounted, the plate being pivotally mounted on said carriage, a stud on the carriage to engage in said cam groove, the latter being formed to traverse the carriage in one direction to effect the cutting operation and to traverse the carriage in the opposite direction back to starting position and also having a non-traversing portion parallel to the plane of the cam wheel to temporarily arrest operation of the tool, a roller on the carriage engaging the aforesaid cam peripheral portion of the cam wheel to shift said plate on its pivot and thereby move the tool into engagement with the work, a spring to move the tool away from the work, and a rotary chuck to hold the work.

3. A screw cutting machine comprising a main shaft, a cam wheel on the shaft provided with a cam groove and a cam peripheral portion adjacent the groove, a reciprocal carriage, a tool adapted to form a screw thread, a plate to which the tool is connected and which has pivotal connection at one end with the carriage, a stud on the carriage engaging in said cam groove, the latter being formed to traverse the carriage in one direction to effect the cutting operation and to traverse the carriage in the opposite direction back to starting position, and also having a non-traversing portion parallel with the plane of the cam on the aforesaid shaft to temporarily arrest operation of the tool, a roller on the carriage engaging the aforesaid cam peripheral portion of the cam wheel to shift said plate on its pivot and thereby move the tool into engagement with the work, a chuck for the support of the work, and a connection between the chuck and the second mentioned cam operable by the latter for automatically opening the chuck during the return movement of the carriage to starting position.

4. In a screw cutting machine, a base, a main shaft journaled on the base, a cam wheel on the shaft provided with a cam groove and a cam peripheral portion adjacent the groove, a dove-tailed guide member on the base, a carriage mounted to reciprocate in said dove-tailed guide, a tool adapted to form a screw thread, a plate on which the tool is mounted, the plate being pivotally mounted on said carriage, a stud on the carriage to engage in said cam groove, the latter being formed to traverse the carriage in one direction to effect the cutting operation and to traverse the carriage in the opposite direction back to starting position and also having a non-traversing portion parallel to the plane of the wheel to temporarily arrest operation of the tool, and a spring pressed roller on the carriage engaging the aforesaid cam peripheral portion of the cam wheel to shift said plate on its pivot and thereby move the tool into engagement with the work.

In testimony whereof we affix our signatures in presence of two witnesses.

FRANCIS C. MASON.
JOHN W. SHANAHAN.

Witnesses:
PALMER A. JONES,
HAROLD O. VAN ANTWERP.